(12) United States Patent
Jung et al.

(10) Patent No.: US 10,442,298 B2
(45) Date of Patent: Oct. 15, 2019

(54) WIRELESS POWER TRANSMISSION DEVICE FOR VEHICLE AND WIRELESS CHARGING METHOD

(71) Applicant: GE HYBRID TECHNOLOGIES, LLC, Niskayuna, NY (US)

(72) Inventors: Chun Kil Jung, Seoul (KR); Byong Uk Hwang, Incheon (KR)

(73) Assignee: GE HYBRID TECHNOLOGIES, LLC, Niskayuna, NY (US)

( * ) Notice: Subject to any disclaimer, the term of this patent is extended or adjusted under 35 U.S.C. 154(b) by 422 days.

(21) Appl. No.: 14/917,804

(22) PCT Filed: Sep. 30, 2014

(86) PCT No.: PCT/KR2014/009186
§ 371 (c)(1),
(2) Date: Mar. 9, 2016

(87) PCT Pub. No.: WO2015/050360
PCT Pub. Date: Apr. 9, 2015

(65) Prior Publication Data
US 2016/0221459 A1    Aug. 4, 2016

Related U.S. Application Data

(60) Provisional application No. 61/885,522, filed on Oct. 2, 2013.

(51) Int. Cl.
*H01F 38/00* (2006.01)
*B60L 11/18* (2006.01)
(Continued)

(52) U.S. Cl.
CPC .......... *B60L 11/1816* (2013.01); *B60L 53/12* (2019.02); *B60L 53/14* (2019.02); *B60L 53/60* (2019.02);
(Continued)

(58) Field of Classification Search
USPC .......................................................... 307/104
See application file for complete search history.

(56) References Cited

U.S. PATENT DOCUMENTS

| 2012/0153894 A1 | 6/2012 | Widmer .................... 320/108 |
| 2013/0002035 A1 | 1/2013 | Oodachi et al. ............ 307/104 |

(Continued)

FOREIGN PATENT DOCUMENTS

| JP | 2013-176196 A | 9/2013 |
| KR | 10-0971705 B1 | 7/2010 |
| KR | 10-1171142 B1 | 8/2012 |
| KR | 10-2013-0003965 A | 1/2013 |

OTHER PUBLICATIONS

International Search Report dated Dec. 24, 2014, issued to the corresponding International Application No. PCT/KR2014/009186.
(Continued)

*Primary Examiner* — Rexford N Barnie
*Assistant Examiner* — Dru Parries
(74) *Attorney, Agent, or Firm* — DeLizio Law, PLLC

(57) ABSTRACT

A wireless power transmission device for a vehicle and a wireless charging method are provided. The wireless charging method by the wireless power transmission device for a vehicle can comprise the steps of: transmitting a signal for detection of a wireless power reception device by using a lower frequency band than an operating frequency band used to control the vehicle; receiving a response signal for the transmitted signal and a power control signal from the wireless power reception device; controlling an operating frequency and/or a voltage in the wireless power transmission device for the vehicle according to the power control signal; and transmitting wireless power to the wireless power reception device.

13 Claims, 7 Drawing Sheets

(51) Int. Cl.
  *H02J 50/60* (2016.01)
  *H02J 50/40* (2016.01)
  *H02J 50/12* (2016.01)
  *H02J 50/80* (2016.01)
  *H02J 17/00* (2006.01)
  *H02J 5/00* (2016.01)
  *H02J 7/02* (2016.01)
  *B60L 53/14* (2019.01)
  *B60L 53/12* (2019.01)
  *B60L 53/60* (2019.01)

(52) U.S. Cl.
  CPC .............. *H02J 5/005* (2013.01); *H02J 7/025* (2013.01); *H02J 17/00* (2013.01); *H02J 50/12* (2016.02); *H02J 50/40* (2016.02); *H02J 50/60* (2016.02); *H02J 50/80* (2016.02); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01)

(56) References Cited

U.S. PATENT DOCUMENTS

2013/0214735 A1* 8/2013 Kang .................. H02J 17/00
                                                    320/108
2015/0194815 A1* 7/2015 Rofe ................... H02J 50/12
                                                    307/104

OTHER PUBLICATIONS

"Qi System Description Wireless Power Transfer", Wireless Power Consortium, vol. 1:Low Power, Part 1:Interface Definition, Version 1.0.1, Oct. 2010, 88 pages.
"CN Application No. 201480055010 First Office Action", dated Nov. 27, 2017, 9 pages.
"CN Application No. 201480055010 Second Office Action", dated Jul. 23, 2018, 9 pages.
"CN Application No. 201480055010 Third Office Action", dated Feb. 2, 2019, 5 pages.
"International Application No. PCT/KR2014/009186 International Preliminary Report on Patentability", dated Apr. 5, 2016, 8 pages.

\* cited by examiner

Series resonance curve

——— Transmission unit frequency-current characteristic curve
------ Reception unit frequency-current characteristic curve
—·—·— Maximum current frequency (F1)
——— Minimum current frequency (F2)

——— Transmission unit frequency-current characteristic curve
------- Reception unit frequency-current characteristic curve
—·—· Maximum current frequency (F1)
——— Minimum current frequency (F2)

WIRELESS POWER TRANSMISSION DEVICE FOR VEHICLE AND WIRELESS CHARGING METHOD

CROSS-REFERENCE TO RELATED APPLICATIONS

This application is a national stage of International Application No. PCT/KR2014/009186, filed Sep. 30, 2014, which claims the benefit of priority to U.S. Provisional Application No. 61/885,522, filed Oct. 2, 2013, in the U.S. Patent and Trademark Office, the disclosures of which are incorporated herein by reference.

BACKGROUND OF THE INVENTION

Field of the Invention

The present invention relates to a wireless power transmission device mounted on a vehicle and a wireless charging method.

Related Art

Recently, propagation of portable electronic devices including a smart phone, a laptop, a MP3 (MPEG-1 audio Layer-3) player, a headset, and the like has been spread. However, since the portable electronic device operates by consuming power stored in a battery cell (for example, a primary battery, a secondary battery, and the like), the battery cell needs to be charged or replaced in order to continuously operate the portable electronic device.

Methods of charging the battery cell are largely classified into a contact charging method of charging the battery cell by using a power supply line and a power supply terminal and a non-contact charging method of charging wireless power induced by a magnetic field generated in a primary coil of a wireless power transmission device by using a wireless power reception device. However, in the contact charging method, when the charger and the battery are coupled with each other or separated from each other, an instantaneous discharge phenomenon appears while different potentials are generated at both terminals. Since the terminal is exposed outside, the fire may occur when the foreign material is filed in the terminal, and there are problems in that the battery due to moisture is naturally discharged and the lifespan and the performance of the battery are deteriorated. Accordingly, recently, the study on the non-contact charging method has been actively in progress in order to solve the aforementioned problems.

As one of techniques on the non-contact charging method, in "non-contact point charging system" in Korea Patent Registration No. 10-0971705, it is disclosed that when the load change is detected in a primary core unit of a non-contact point power transmission device, a delay time from an output time of a request signal to a reception time of a response signal corresponding to the request signal and compared with a reference delay time. Thereafter, when the measuring time is smaller than the reference standby time, the corresponding object is determined as the foreign material, and when the measuring time is larger than the reference standby time, the corresponding object is determined as a normal non-contact point power reception device and then the wireless power signal is transmitted.

The wireless power transmission system may be classified into a magnetic induced method and a resonance induced method. The magnetic induced type wireless power transmission system according to a wireless power consortium (WPC) standard is a system having a frequency characteristic set to 100 KHz and uses a frequency band of 110 KHz to 205 KHz. Meanwhile, an electro-magnetic compatibility (EMC) standard is managed based on a frequency band of 150 KHz with respect to the vehicle. For example, the smart key controlling the vehicle uses 125 KHz as the operation frequency. Accordingly, when the magnetic induced type wireless power transmission system is constructed in the vehicle, the interference between the operation frequency of the wireless power transmission system and the operation frequency controlling the corresponding vehicle may occur. This causes malfunction of the wireless power transmission system and the vehicle. When the vehicle is malfunctioned, a large accident may occur. Therefore, a wireless power transmission device for a vehicle and a wireless charging method, which are compatible with the existing wireless power transmission system while avoiding an interference frequency with the electronic devices provided in the vehicle, are required.

SUMMARY OF THE INVENTION

The present invention provides a wireless power transmission device for a vehicle and a wireless charging method capable of avoiding a frequency interference with electronic devices provided in a vehicle.

The present invention also provides a wireless power transmission device for a vehicle compatible with an existing wireless power transmission system and a wireless charging method.

In an aspect, a wireless charging method by a wireless power transmission device for a vehicle is provided. The method includes transmitting a signal for detecting a wireless power reception device by using a frequency band lower than an operation frequency band used in control of the vehicle, receiving a response signal for the transmitted signal and a power control signal from the wireless power reception device, controlling at least one of an operation frequency and voltage in the wireless power transmission device for the vehicle, and transmitting wireless power to the wireless power reception device.

As an example, the operation frequency band used in the control of the vehicle may include an operation frequency band of a smart key.

As another example, the resonance frequency of the wireless power transmission device for the vehicle may be lower than the resonance frequency of the wireless power reception device.

As yet another example, the resonance frequency of the wireless power transmission device for the vehicle and the resonance frequency of the wireless power reception device may be different from each other.

As still another example, the resonance frequency of the wireless power transmission device for the vehicle may be higher than the resonance frequency of the wireless power reception device.

As still yet another example, the controlling may include setting the operation frequency to a higher frequency in the frequency band, when the power control signal indicates an increase in the wireless power.

As still yet another example, the controlling may include setting the operation frequency to a lower frequency in the frequency band, when the power control signal indicates a decrease in the wireless power.

In another aspect, a wireless power transmission device for a vehicle is provided. The wireless power transmission device includes a primary coil transmitting a signal for detecting a wireless power reception device and a power signal by using a frequency band lower than an operation frequency band used in control of the vehicle, an electric driving unit connected to the primary coil to apply an electric driving signal to the primary coil so that an electromagnetic is generated, and a control unit controlling at least one of the operation frequency of the wireless power transmission device for the vehicle and the voltage in the wireless power transmission device for the vehicle according to the power control signal received from the wireless power reception device.

The wireless power transmission device for the vehicle can avoid frequency interference between the electronic devices provided in the vehicle like the smart key when performing the wireless charging and have compatibility with an existing wireless power transmission system.

Figure 1:
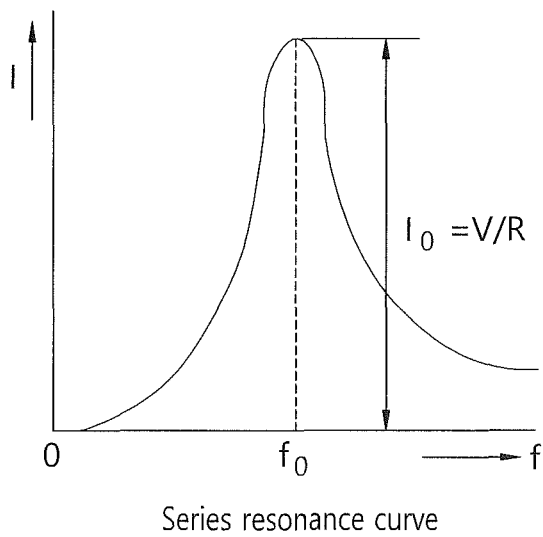
FIG. 1 is a diagram illustrating a series resonance curve for wireless power transmission.

DESCRIPTION OF EXEMPLARY
EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Parts which are not related with the description are omitted in order to clearly describe the present invention in the drawings and like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "unit" described in the specification mean units for processing at least one function and operation and can be implemented by hardware components or software components and combinations thereof.

The term "wireless power" used in this specification means any form of energy related with an electric field, a magnetic field, an electromagnetic field, and the like which are transmitted from a transmitter to a receiver without using physical electromagnetic conductors. Wireless power may also be called a power signal and mean an oscillating magnetic flux vibrating while being enclosed by a primary coil of a transmission side and a secondary coil of a reception side. Hereinafter, power conversion in a wireless power transmission system for wirelessly charging wireless power devices including a mobile phone, a cordless phone, a smart phone, an MP3 player, a laptop, a headset, and the like will be described as an example. A basic principle of wireless power transmission includes both a magnetic induced coupling method and a magnetic resonance coupling (that is, resonance induction) method using frequencies having less than 30 MHz. However, in relatively high radiation levels, for example, various frequencies including frequencies in which a license-exempt operation in less than 135 kHz (LF) or 13.56 MHz (HF) is allowed may be used.

Figure 2:
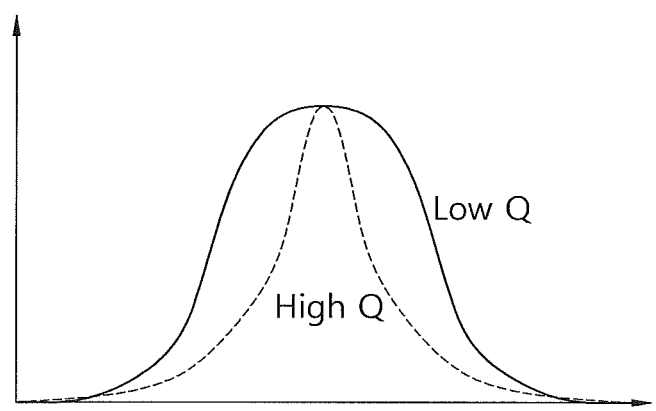
FIG. 2 is a diagram for describing a frequency band using in a wireless power transmission system.

FIG. 1 is a diagram illustrating a series resonance curve for wireless power transmission, and FIG. 2 is a diagram for describing a frequency band using in a wireless power transmission system.

A wireless power transmission system operates by using a right-directional frequency band (that is, a frequency band higher than a resonance frequency) of a resonance frequency $f_o$ in a series resonance curve as illustrated in FIG. 1. In an LC series resonance structure, the resonance frequency fo is set based on the following Equation 1.

$$f_0 = \frac{1}{2\pi\sqrt{LC}} \qquad \text{[Equation 1]}$$

In this case, the transmission side controls transmission power by lifting up or down an operation frequency toward the resonance frequency $f_o$, according to a value of a power compensation signal received from a reception side.

Meanwhile, a difference between resonance frequencies at points where 3 dB, that is, a current value is reduced by half to both sides based on the resonance frequency is referred to as a 3 dB bandwidth, and a value obtained by dividing the resonance frequency $f_o$ by 3 dB is a Q value. Accordingly, as illustrated in FIG. 2, as a resonance characteristic is sharper, the 3 dB bandwidth is decreased and the Q value is increased (High Q). Therefore, in a circuit, a circuit Q value is related with the bandwidth. That is, when the Q value of the circuit is low, it is meant that the bandwidth is wide, and when the Q value is high, it is meant that the bandwidth is narrow. Herein, the resonance means a selective characteristic of a specific frequency. Selecting sharply the frequency eventually means increasing the Q value. In the case where the narrow frequency band is fixedly required, the Q value needs to be high. On the contrary, when the used frequency band is wide, the Q value needs to be low. Accordingly, when the wireless power transmission system is designed, it is important how much the selection degree and the bandwidth are required, and the selection degree and the bandwidth are determined by the Q value. Therefore, the wireless power transmission system according to the present invention may widely use the frequency band by using the resonance in which the Q value is low.

Figure 3:
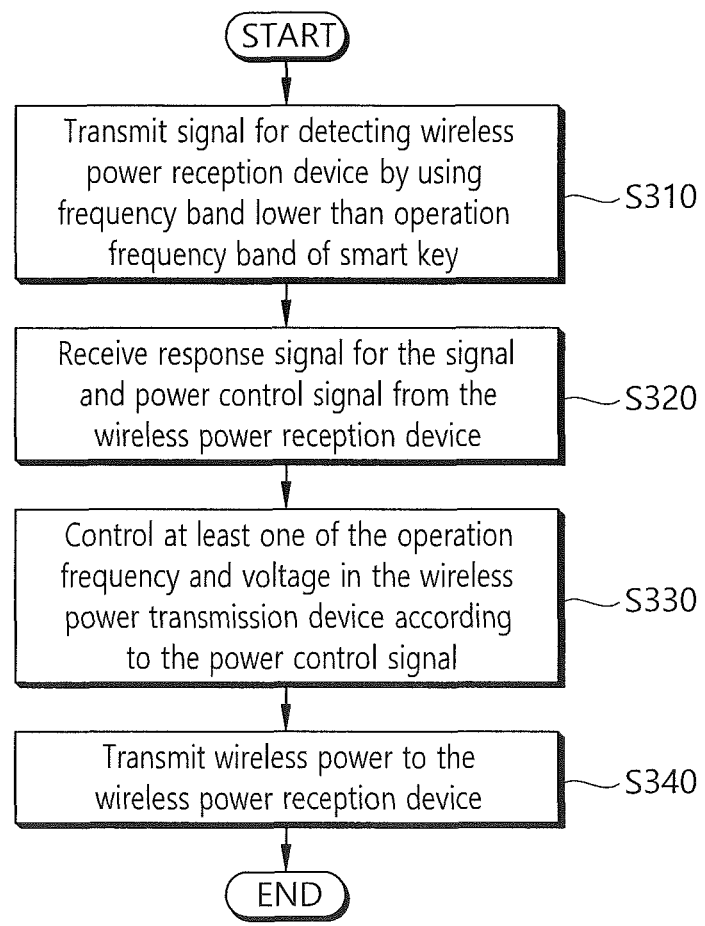
FIG. 3 is a flowchart illustrating a wireless charging method of a wireless power transmission device for a vehicle according to an exemplary embodiment of the present invention.

FIG. 3 is a flowchart illustrating a wireless charging method of a wireless power transmission device for a vehicle according to an exemplary embodiment of the present invention.

The wireless power transmission device for the vehicle according to the present invention may perform a process illustrated in FIG. 3 for charging a battery cell as an example. Herein, the battery cell may be included in the portable electronic device and connected or included to (in)

a wireless power reception device. For example, the wireless power transmission device for the vehicle according to the present invention may be included in the vehicle, and in this case, the portable electronic device may charge the battery cell by using the wireless power reception device in the vehicle.

Referring to FIG. 3, the wireless power transmission device for the vehicle transmits a signal for detecting the wireless power reception device by using a lower frequency band than the operation frequency controlling the vehicle (S310). For example, the operation frequency band controlling the vehicle may include an operation frequency band of a smart key. Further, the smart key may operate at a frequency of 125 KHz, and the wireless power transmission device for the vehicle may use a frequency band of 90 to 110 KHz.

Meanwhile, the wireless power transmission device for the vehicle may perform wireless charging by using a lower frequency band than the resonance frequency set in the wireless power transmission device for the vehicle. The resonance frequency in the wireless power transmission device for the vehicle according to the present invention may be different from the resonance frequency in the wireless power reception device. As an example, the resonance frequency in the wireless power transmission device for the vehicle may be set to be higher than the resonance frequency of 100 KHz in the wireless power reception device.

Further, the signal for detecting the wireless power reception device may be a digital ping. In the digital ping, the wireless power reception device may transmit required information to the wireless power transmission device, and the wireless power transmission device for the vehicle according to the present invention may receive a response signal for the digital ping, a power control signal, and the like from the wireless power reception device by using the frequency band (S320). For example, when the wireless power reception device receives the digital ping from the wireless power transmission device, the wireless power reception device may transmit information on a unique identifier (ID), a manufacturer ID, and the like of the wireless power reception device to the wireless power transmission device by using load modulation. Further, the wireless power reception device may transmit power control information of requesting for controlling a level of wireless power received from the wireless power transmission device, charging state information of representing a charged level of the battery cell, full-charging information of notifying that the battery cell is fully charged, signal intensity information for determining a primary coil for power transmission at the transmission side, rectified power information representing an amount of the power supplied to output, and the like, through the load modulation. Even though an object is detected through the digital ping, when the unique ID, the manufacturer ID, and the like of the wireless power reception device are not received, the wireless power transmission device for the vehicle according to the present invention may determine the corresponding object as a foreign object. When the detected object is determined as the foreign object, the wireless power transmission device for the vehicle does not transmit the wireless power. When the detected object is identified as the wireless power reception device, the wireless power transmission device for the vehicle may start the wireless power transmission.

Meanwhile, when the power control signal is received from the wireless power reception device while transmitting the wireless power, the wireless power transmission device for the vehicle may control at least one of the operation frequency of the wireless power transmission device for the vehicle and voltage in the wireless power transmission device for the vehicle according to the power control signal (S330). For example, when the power control signal indicates an increase in the wireless power, that is, the wireless power reception device requests more power to be transmitted, the wireless power transmission device for the vehicle may set the operation frequency as a higher frequency in the frequency band set in the wireless power transmission device for the vehicle. On the contrary, when the power control signal indicates a decrease in the wireless power, the wireless power transmission device for the vehicle may set the operation frequency as a lower frequency in the frequency band. Thereafter, the wireless power transmission device for the vehicle may transmit the wireless power controlled according to the power control signal based on the frequency control and/or power control to the corresponding wireless power reception device (S340).

Figure 4:
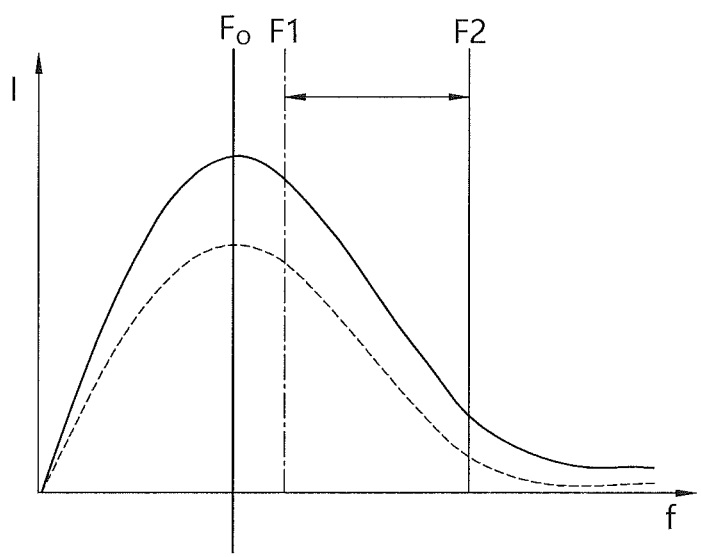
FIG. 4 is a diagram for describing a power control method of a general wireless power transmission device.
Figure 5:
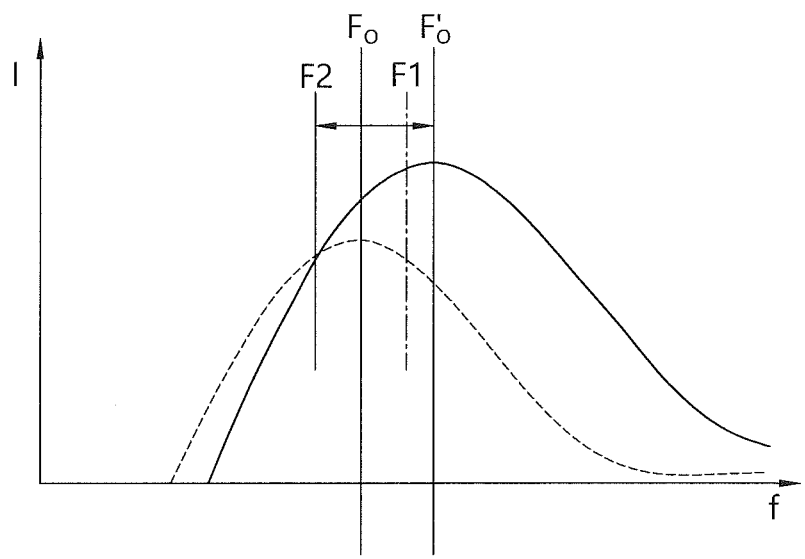
FIG. 5 is a diagram for describing a power control method of a wireless power transmission device according to another exemplary embodiment of the present invention.

FIG. 4 is a diagram for describing a power control method of a general wireless power transmission device, and FIG. 5 is a diagram for describing a power control method of a wireless power transmission device according to another exemplary embodiment of the present invention. Hereinafter, a power control method of a wireless power transmission device according to the present invention will be described in more detail with reference to FIGS. 4 and 5.

First, referring to FIG. 4, a general wireless power transmission device uses the resonance frequency $F_o$ of 100 KHz like the wireless power reception device and controls the operation frequency to a maximum current frequency F1 when largely transmitting the power and to a minimum current frequency F2 when less transmitting the power. In this case, the maximum current frequency F1 may be 110 KHz and the minimum current frequency F2 may be 205 KHz (F1<F2). That is, the frequency band used in the wireless power transmission device may be 110 KHz to 205 KHz. However, when the frequency band used in the general wireless power transmission device is used as it is in the vehicle, interference between the frequency used in the general wireless power transmission device and the frequency used in electronic devices provided in the vehicle may occur. Particularly, since a smart key controlling the vehicle may use 125 KHz as the operation frequency, when the general wireless power transmission device is used in the vehicle, the vehicle malfunctions by the interference between the operation frequency of the smart key and the operation frequency of the general wireless power transmission device. Accordingly, the wireless power transmission device for the vehicle according to the present invention may use a left frequency band (a lower frequency band than the resonance frequency of the wireless power transmission device for the vehicle) based on a resonance frequency $F'_o$ of the wireless power transmission device for the vehicle as illustrated in FIG. 5. Further, because the used (alternatively, operation) frequency band is narrow, voltage control may be used together if necessary. As an example, the wireless power transmission device for the vehicle according to the present invention may use the frequency band of 90 KHz to 110 KHz. However, in this case, position of the maximum current frequency F1 and position of the minimum current frequency F2 are reversed based on the resonance frequency $F_o$ of the wireless power reception device (F2<F1). Accordingly, in F2 to $F_o$, that is, in the case where the operation frequency is lower than $F_o$, when the same frequency control (frequency decrease) as the existing frequency is performed with respect to a positive signal (a signal to more transmit the power) transmitted by the wireless power reception device, the reception power of the wireless power reception device is decreased, and thus, the wireless power transmission device for the vehicle reversely performs the frequency control to the existing frequency. That is, the wireless power transmission device for the vehicle according to the present invention may set the operation frequency to be increased to the resonance frequency $F'_o$ with respect to additional power demand wireless power reception device when the operation frequency is set between F2 to $F_o$. On the contrary, with respect to power decrease demand of the wireless power reception device, the operation frequency may be set to the minimum current frequency F2. Due to such an operation, the wireless power transmission device for the vehicle according to the present invention is compatible with the general wireless power reception device.

Figure 6:
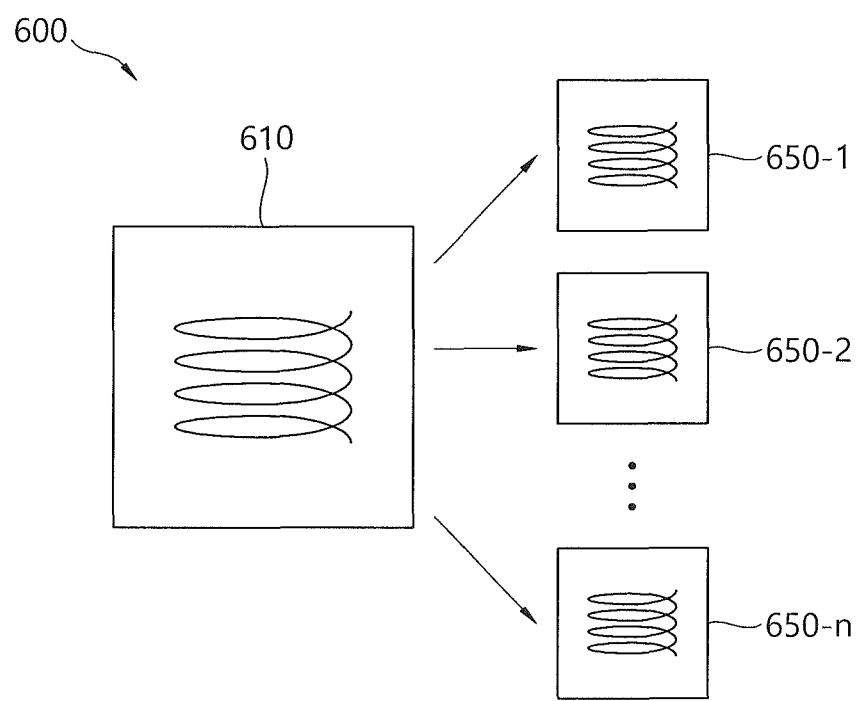
FIG. 6 is a diagram illustrating a wireless power transmission system to which the present invention is applied.

FIG. 6 is a diagram illustrating a wireless power transmission system to which the present invention is applied.

Referring to FIG. 6, a wireless power transmission system 600 includes a wireless power transmission device 610 and one wireless power reception device 650-1 or n (herein, n is a natural number) wireless power transmission devices 650-1, . . . , 650-n. The wireless power transmission device 610 may be the wireless power transmission device for the vehicle.

The wireless power transmission device 610 includes a primary core. The primary core may include one or more primary coils. The wireless power transmission device 610 may have any suitable form, but one preferable form may be a flat platform having a power transmission surface. The respective wireless power reception devices 650-1, . . . , 650-n may be positioned on the platform or near the platform.

Each of the wireless power reception devices 650-1, . . . , 650-n may be separated from the wireless power transmission device 610. When each of the wireless power reception devices 650-1, . . . , 650-n is positioned near the wireless power transmission device 610, each of the wireless power reception devices 650-1, . . . , 650-n includes a secondary core coupled with an electromagnetic field generated by the primary core of the wireless power transmission device 610. The secondary core may include one or more secondary coils.

The wireless power transmission device 610 transmits the power to the wireless power reception devices 650-1, . . . , 650-n without direct electric contact. In this case, the primary core and the secondary core are magnetic induced-coupled or resonance-induced coupled with each other. The primary coil or the secondary coil may have any suitable forms. As an example, the primary core and the secondary core may be copper coils wound around a formation having high permeability such as ferrite or amorphous material.

The wireless power reception devices 650-1, . . . , 650-n are connected to an external load (not illustrated, herein, also referred to as an actual load of the wireless power reception device) to supply the power wirelessly received from the wireless power transmission device 610 to the external load. For example, the wireless power reception devices 650-1, . . . , 650-n may carry the received power to an object which consumes or stores the power, like a portable electric or electronic device or a rechargeable battery cell or cell, respectively.

Figure 7:
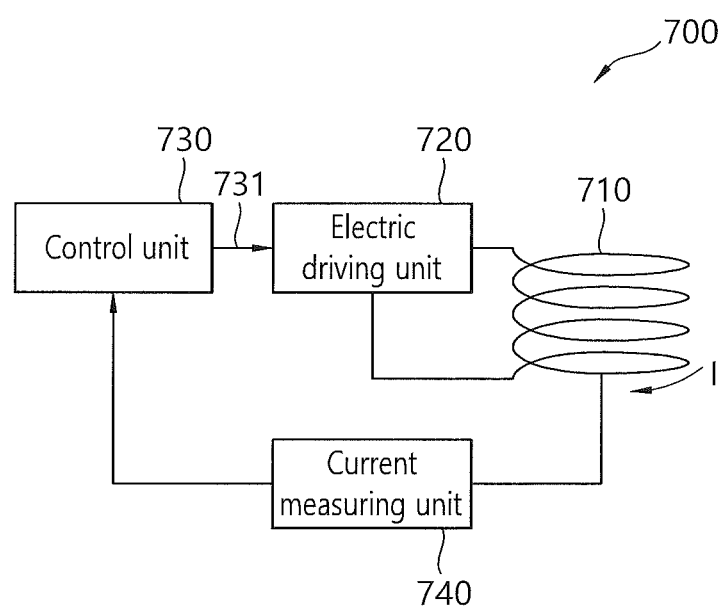
FIG. 7 is a block diagram illustrating a wireless power transmission device for a vehicle according to yet another exemplary embodiment of the present invention.

FIG. 7 is a block diagram illustrating a wireless power transmission device for a vehicle according to yet another exemplary embodiment of the present invention.

Referring to FIG. 7, a wireless power transmission device 700 for a vehicle includes a primary coil 710, an electric driving unit 720, a control unit 730, and a current measuring unit 740.

The primary coil 710 transmits a detecting signal of the wireless power reception device and a power signal by using a frequency band lower than an operation frequency band of a smart key.

The electric driving unit 720 is connected to the primary coil 710 to apply electric driving signals to the primary coil 710 so that the electromagnetic field is generated in the primary coil 710.

The control unit 730 is connected to the electric driving unit 720 to generate a control signal 731 that controls an alternating current (AC) signal required when the primary coil 710 generates an induced magnetic field or magnetic resonance. The control unit 730 may control at least one of the operation frequency and the voltage in the wireless power transmission device according to the power control signal received from the wireless power reception device.

The current measuring unit 740 measures current flowing in the primary coil 710. The current measured by the current measuring unit 740 may be AC. As an example, the current measuring unit 740 may be a current sensor. Alternatively, the current measuring unit 740 may be a transformer which lowers and uses high current flowing in the primary coil to low current.

The control unit 730 may obtain information transmitted by the wireless power reception device by using the current value measured in the current measuring unit 740. Until the demand power is satisfied by changing the load, the wireless power reception device may continuously/periodically transmit the power control signal requesting the power increase or the power control signal requesting the power decrease to the wireless power transmission device 700 for the vehicle. For example, when the control unit 730 receives the power control signal requesting the power increase from the wireless power reception device through the load change, the intensity of the current flowing in the primary coil 710 may increase so that higher power is transmitted as the response thereto. In more detail, the control unit 730 may adjust the control signal 731 so that an AC signal larger than a reference AC signal may be applied to the primary coil 710 in order that larger current flows in the primary coil 710. On the contrary, when the control unit 730 receives the power control signal requesting the power decrease from the wireless power reception device, the control signal 731 may be adjusted so that the AC signal lower than the reference AC signal may be applied to the primary coil 710 in order that the power lower than the current transmission power is transmitted.

Further, when the operation frequency of the wireless power transmission device for the vehicle is lower than the resonance frequency of the wireless power reception device, in order to transmit larger wireless power through the primary coil 710, the control unit 730 may set the operation frequency to a higher frequency in the operation frequency band of the wireless power transmission device 700 for the vehicle. On the contrary, when the operation frequency of the wireless power transmission device for the vehicle is lower than the resonance frequency of the wireless power reception device, in order to transmit lower wireless power through the primary coil 710, the control unit 730 may set the operation frequency to a lower frequency in the operation frequency band of the wireless power transmission device 700.

Meanwhile, even though the operation frequency of the wireless power transmission device for the vehicle is the same as the resonance frequency of the wireless power reception device, when the wireless power reception device requires the power increase, the control unit 730 may adjust the control signal 731 so that the AC signal larger than the reference AC signal may be applied to the primary coil 710. On the contrary, even though the operation frequency of the wireless power transmission device for the vehicle is the same as F1 or F2, when the wireless power reception device requires the power decrease, the control unit 730 may adjust the control signal 731 so that the AC signal lower than the reference AC signal may be applied to the primary coil 710. A series of the aforementioned process is collectively referred to as a power control.

The primary coil 710 may transmit the wireless power controlled by the control unit 730 to the wireless power reception device according to the power control signal received from the wireless power reception device.

Meanwhile, even though illustrated in FIG. 7, the wire power transmission device for the vehicle according to the present invention may include a shield member for protecting the wireless power transmission device for the vehicle from a stray magnetic field or an eddy current.

Further, the wireless power transmission device for the vehicle according to the present invention may include a temperature protection circuit of monitoring the temperature around the interface. When the temperature measured by the temperature protection circuit is more that a threshold value, the wireless power transmission device for the vehicle according to the present invention may stop or end the power transmission for safety.

The above description just illustrates the technical spirit of the present invention and various modifications and transformations can be made by those skilled in the art without departing from an essential characteristic of the present invention. Accordingly, the various embodiments disclosed herein are not intended to limit the technical spirit but describe with the true scope and spirit being indicated by the following claims. The scope of the present invention should be interpreted by the appended claims and all technical spirit in the equivalent range thereto should be interpreted to be embraced by the claims of the present invention.

What is claimed is:

1. A wireless charging method performed by a wireless power transmission device for use in a vehicle, the method comprising:
    transmitting, from the wireless power transmission device, a detecting signal for detecting a wireless power reception device, wherein the detecting signal is in a frequency band that is different than an operation frequency band used in control of the vehicle;
    receiving a response signal and a power control signal from the wireless power reception device in response to the detecting signal;
    controlling at least one of a power signal frequency or a voltage of wireless power produced by the wireless power transmission device according to the power control signal; and
    transmitting the wireless power to the wireless power reception device,
    wherein the controlling includes adjusting the power signal frequency of the wireless power based, at least in part, on a resonance frequency of the wireless power reception device and different than the operation frequency band used in control of the vehicle.

2. The wireless charging method of claim 1, wherein the operation frequency band used in the control of the vehicle includes an operation frequency band of a smart key.

3. The wireless charging method of claim 1, wherein the power signal frequency of the wireless power produced by the wireless power transmission device and the resonance frequency of the wireless power reception device are different from each other.

4. The wireless charging method of claim 3, wherein the power signal frequency of the wireless power produced by the wireless power transmission device is higher than the resonance frequency of the wireless power reception device.

5. The wireless charging method of claim 1, wherein the controlling includes:
    setting the power signal frequency to a higher frequency when the power control signal indicates a request for an increase in the wireless power and the power signal frequency is lower than the resonance frequency of the wireless power reception device; and
    setting the power signal frequency to a lower frequency when the power control signal indicates a request for an increase in the wireless power and the power signal frequency is higher than the resonance frequency of the wireless power reception device.

6. The wireless charging method of claim 1, wherein the controlling includes:
    setting the power signal frequency to a lower frequency when the power control signal indicates a request for a decrease in the wireless power and the power signal frequency is lower than the resonance frequency of the wireless power reception device; and
    setting the power signal frequency to a higher frequency when the power control signal indicates a request for a decrease in the wireless power and the power signal frequency is higher than the resonance frequency of the wireless power reception device.

7. A wireless power transmission device for use in a vehicle comprising:
    a primary coil configured to transmit a detecting signal for detecting a wireless power reception device, wherein the detecting signal is in a frequency band that is different than an operation frequency band used in control of the vehicle;
    the primary coil configured to receive a response signal and a power control signal from the wireless power reception device in response to the detecting signal;
    the primary coil configured to produce wireless power for the wireless power reception device; and
    a control unit configured to control at least one of a power signal frequency or a voltage of the wireless power produced by the wireless power transmission device according to the power control signal,
    wherein the control unit is further configured to adjust the power signal frequency of the wireless power based, at least in part, on a resonance frequency of the wireless power reception device and different than the operation frequency band used in control of the vehicle.

8. The wireless power transmission device of claim 7, wherein the operation frequency band used in the control of the vehicle includes an operation frequency band of a smart key.

9. The wireless power transmission device of claim 7, wherein the power signal frequency of the wireless power produced by the wireless power transmission device and the resonance frequency of the wireless power reception device are different from each other.

10. The wireless power transmission device of claim 9, wherein the power signal frequency of the wireless power produced by the wireless power transmission device is higher than the resonance frequency of the wireless power reception device.

11. The wireless power transmission device of claim 7,
wherein the control unit sets the power signal frequency to a higher frequency when the power control signal indicates a request for an increase in the wireless power and the power signal frequency is lower than the resonance frequency of the wireless power reception device, and
wherein the control unit sets the power signal frequency to a lower frequency when the power control signal indicates a request for an increase in the wireless power and the power signal frequency is higher than the resonance frequency of the wireless power reception device.

12. The wireless power transmission device of claim 7,
wherein the control unit sets the power signal frequency to a lower frequency when the power control signal indicates a request for a decrease in the wireless power and the power signal frequency is lower than the resonance frequency of the wireless power reception device, and
wherein the control unit sets the power signal frequency to a higher frequency when the power control signal indicates a request for a decrease in the wireless power and the power signal frequency is higher than the resonance frequency of the wireless power reception device.

13. The method of claim 1, wherein the controlling includes:
adjusting the power signal frequency to a higher frequency or a lower frequency based on the power control signal,
wherein the power signal frequency is adjusted in a first direction when the power signal frequency is lower than the resonance frequency of the wireless power reception device, and
wherein the power signal frequency is adjusted in a second direction that is reverse of the first direction when the power signal frequency is higher than the resonance frequency of the wireless power reception device.

* * * * *